(No Model.)

S. S. HELLYER.
TRAP FOR SOIL AND OTHER PIPES.

No. 320,435. Patented June 16, 1885.

ATTEST.
J. Henry Kaiser.
Jacob Felbel

INVENTOR.
Samuel S. Hellyer,
By J. M. Lutré
Attorney.

UNITED STATES PATENT OFFICE.

SAMUEL S. HELLYER, OF LONDON, COUNTY OF MIDDLESEX, ENGLAND.

TRAP FOR SOIL AND OTHER PIPES.

SPECIFICATION forming part of Letters Patent No. 320,435, dated June 16, 1885.

Application filed October 10, 1884. (No model.) Patented in England March 25, 1880, No. 1,269.

*To all whom it may concern:*

Be it known that I, SAMUEL S. HELLYER, of London, in the county of Middlesex and Kingdom of Great Britain, have invented certain new and useful Improvements in Traps for Soil and other Pipes, (for which I have received Letters Patent of Great Britain, dated March 25, 1880, No. 1,269;) and I do hereby declare that the following is a full, clear, and exact description thereof, reference being had to the accompanying drawings, making part of this specification.

My invention relates to certain new and useful improvements in traps designed for use in connection with soil and other waste pipes, and has for its main object to provide for use a trap of such novel construction as will be less likely to have the seal broken than in the case of the ordinary siphon-trap and such others as have been used prior to my invention, and also one which will be less liable to clog up than the D-trap, and which will be in all respects more efficient and desirable in operation than those heretofore known and used.

To these main ends and objects my invention consists in certain novel features of construction, which will be hereinafter more fully explained, and which will be particularly pointed out and defined in the claims of this specification.

To enable those skilled in the art to which my invention relates to make and use the same, I will now proceed to describe the construction and operation of a trap embracing my invention carried out in that form in which I have so far successfully practiced it, referring by letters of reference to the accompanying drawings, which make part of this specification, and in which—

Figure 1:
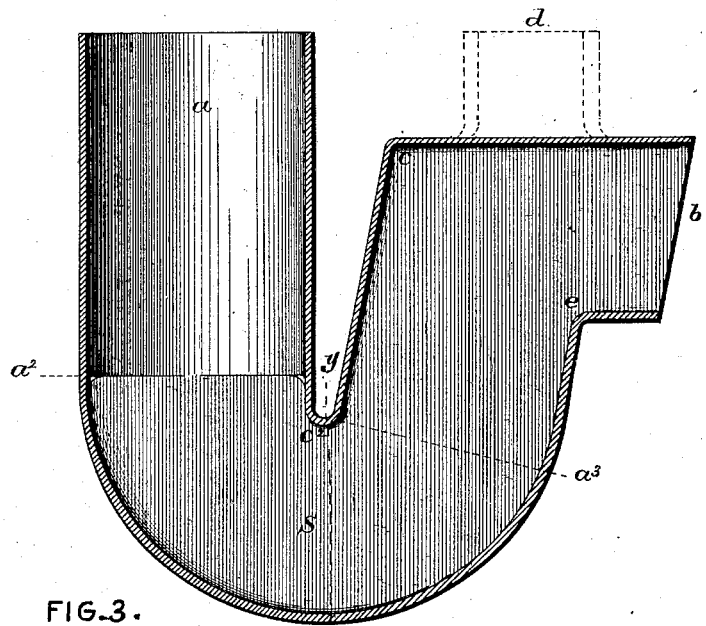
Figure 3:
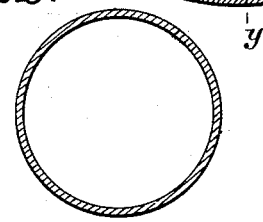
Figure 2:
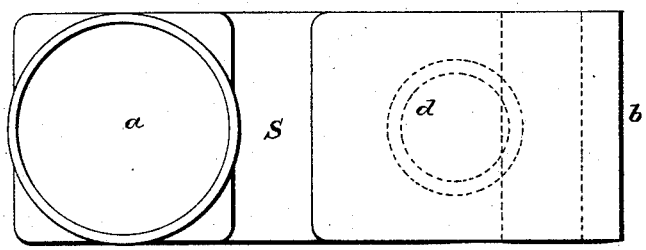

Figure 1 is a vertical central section of a trap made according to my invention. Fig. 2 is a top view of the same; and Fig. 3 is a vertical section taken at the line *y y* of Fig. 1, the same parts in the different views being indicated by the same letter of reference.

In the drawings, *a* represents the inlet or descending leg of the trap, while S represents the bowl-like or receptacle portion of the trap, and *b* the outlet or discharge-exit of the trap.

The dotted lines at *d* indicate an ordinary ventilating-tube, arranged nearly over the ascending leg of the trap.

The descending leg or inlet *a* is, as usual, cylindrical in form, but where it runs into the curved or bowl-like portion of the trap (at a plane about coincident with the line $a^2$) said inlet is translated into a bowl-like portion, which is square in cross section, and consequently has a cross-sectional area greater than that of the descending leg or inlet-pipe *a*, and this square contour or cross-sectional form is continued from the point $a^2$ throughout the rest of the trap and to its exit or outlet point *b*.

The portion of the bowl-like part, which constitutes what is called the "dip" of the trap, at $c^2$ is extended downwardly to such an extent as to make the cross-sectional area of the bowl-like portion of the trap immediately beneath the dip considerably less than the cross-sectional area of said portion of the trap at either the line $a^2$ or at the dotted line $a^3$. In other words, the cross sectional area of the bowl-like portion of the trap is least in a vertical plane in which the dip of the trap lies, and increases from thence in both directions—that is, toward the descending and also toward the ascending portions of the bowl of the trap. The object and effect of this peculiarity of construction are two fold: in the first place, the body or column of water descending into the trap from the inlet-pipe *a* has to be contracted or subjected to an increasing pressure in order to pass beneath the dip $c^2$, and, in the second place, after passing this point, the column of water is permitted to expand into a larger space, by reason of all of which not only is there a swabbing or better clearing-out action produced by the flow of water at the bottom of the trap, but there is also less tendency to siphonage of the trap by the outrushing water in the up-stand portion of the trap. The water passing down the inlet and thence through the trap, having to be forced through a smaller space immediately beneath the dip of the trap, produces a better swabbing-out action on the trap, and as the outflowing column then begins to ascend, air-spaces are more apt to form in the up-stand portion of the trap, and hence there is likely to be less siphoning action.

This latter advantage is greatest in a case where there may be no free ventilation over the up-stand of the trap. It will be seen that where the inner side of the up-stand portion of the trap joins the top part of the outflow-pipe an obtuse angle is formed, and that the top portion of the outflow is about horizontal and flat.

The operation and effect of this form of structure are these: That the rapidly-ascending column of water, striking against the horizontal and flat top portion of the out-go, will not, as in the case of an ordinary curved-top trap, be deflected or guided toward the outlet *b*, but will in a greater measure have its momentum checked, the effect of all of which will be, when the rush of water ceases, to permit a larger quantity of the water which has rushed upwardly to fall back into the bowl portion of the trap, thus better insuring the retention of a perfect seal therein.

The operation and effect of the angular formation of the trap device at the line *c* is to cause air-spaces to be formed in the upper rear corners, where the up-stand joins the top plate of the outflow-pipe, thus creating a tendency to prevent the formation of a perfect siphon, where no ventilating-tube, such as seen in dotted lines at *d*, is employed. Where the outward-curved portion of the ascending part of the trap-bowl meets the bottom of the outlet *b* an angle, *e*, it will be seen, is formed, and this formation is much more desirable than that usually adopted in the corresponding parts of ordinary S-traps, for the reason that there would be less liability of any smaller portion of the water seal overflowing the highest point of the trap (at *e*) by a wave-like action, such as frequently occurs and induces a portion of the water in the ordinary S-trap to overflow the highest point of the trap.

It will be seen that the up-stand of my improved trap is nearly vertical, or much more nearly so than is the ascending portion of the the ordinary S-trap or the up-stand of any siphon-like trap which has heretofore been made that I know of. This is an important and advantageous point in the construction of my improved trap, since the nearer vertical the up-stand portion can be made the greater the opportunity afforded for a large part of the upwardly-rushing water to fall backward or descend into the trap upon a cessation of the use of the latter, especially in cases where large volumes of water are rushed suddenly through the trap and the supply suddenly stopped.

The usual ventilating-tube (represented at *d* by dotted lines) may in the case of my trap be entirely omitted without danger of such disadvantageous results as would occur in the case of the omission of a ventilating-tube in the use of the ordinary S-trap.

Of course more or less variation may be made in the proportions of the different parts shown and described, and the size of the contrivance may be varied according to circumstances without departing from the gist of my invention, so long as the peculiarities of structure shown and described shall be embodied in the trap.

Having now so fully shown and described my improved trap that those skilled in the art can make and use my invention, what I claim as new, and desire to secure by Letters Patent, is—

1. A trap having the descending or inlet portion *a*, where it runs into the bowl-like part of the trap, translated into a form about square in cross-section and of a cross-sectional area about equal to a square, one side of which equals in length the diameter of the cylindrical portion *a* of the trap.

2. In a trap having the bowl portion about square in cross-section, and having the descending or inlet pipe cylindrical in shape and of less area in cross-section than the bowl portion, but translated into the square form of the latter, as described, the dip *c*, extending down, so as to make the cross-sectional area of the bowl portion of the trap less at the locality immediately beneath said dip, all substantially in the manner and for the purposes hereinbefore described.

3. The trap hereinbefore described having the top portion, or that part located immediately over the up-stand, made flat and in a plane which is nearly at right angles to the line of the up-stand or ascending portion of the trap, substantially as and for the purpose described.

4. In the water-closet trap herein shown and described, in which the bowl-like, the ascending portion, and the outflow portion are all square in cross-section, the formation of the upper part of the trap with an angle at the point *c*, substantially as and for the purpose set forth.

5. In the water-closet trap herein shown and described, composed of a single piece and having the bowl-like, the up stand, and also the outflow portions about square in cross-section, the formation of the trap so as to present an angle at the line *e*, all substantially as and for the purposes hereinbefore set forth.

In testimony whereof I have hereunto set my hand this 18th day of August, 1884.

SAMUEL S. HILLYER.

In presence of—
  J. WATTS,
  JOHN DEAN,
  *Both of* 17 *Gracechurch Street, London.*